(12) United States Patent
Bezawada et al.

(10) Patent No.: US 11,356,753 B1
(45) Date of Patent: Jun. 7, 2022

(54) UTILITY METER WITH SHORT AND LONG-RANGE RADIOS WITH INTELLIGENT SWITCHING THEREBETWEEN

(71) Applicant: Honeywell International Inc., Charlotte, NC (US)

(72) Inventors: Murali Krishna Bezawada, Telangana (IN); Prasad Samudrala, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/165,566

(22) Filed: Feb. 2, 2021

(51) Int. Cl.
| | |
|---|---|
| *G01D 4/00* | (2006.01) |
| *H04W 36/30* | (2009.01) |
| *H04Q 9/02* | (2006.01) |
| *H04W 36/00* | (2009.01) |

(52) U.S. Cl.
CPC .............. *H04Q 9/02* (2013.01); *G01D 4/004* (2013.01); *H04W 36/0022* (2013.01); *H04W 36/305* (2018.08); *H04Q 2209/25* (2013.01); *H04Q 2209/43* (2013.01); *H04Q 2209/60* (2013.01); *H04Q 2209/84* (2013.01)

(58) Field of Classification Search
None
See application file for complete search history.

(56) References Cited

U.S. PATENT DOCUMENTS

| | | | |
|---|---|---|---|
| 7,185,131 B2 | 2/2007 | Leach | |
| 10,033,798 B2 | 7/2018 | Stanwood et al. | |
| 2010/0321205 A1* | 12/2010 | Olson | G01D 4/006 340/870.02 |
| 2013/0121178 A1* | 5/2013 | Mainaud | H04W 40/12 370/252 |
| 2016/0021613 A1* | 1/2016 | Mani | H04W 8/005 370/311 |
| 2019/0324071 A1* | 10/2019 | Poiron | G01R 22/063 |
| 2020/0228156 A1 | 7/2020 | Rose et al. | |

OTHER PUBLICATIONS

Rajawat, "Smart Grid Communications," Jun. 2009.

* cited by examiner

*Primary Examiner* — Curtis A Kuntz
*Assistant Examiner* — Jerold B Murphy
(74) *Attorney, Agent, or Firm* — Seager, Tufte & Wickhem, LLP (57) ABSTRACT

A utility meter includes a metrology core, a short-range radio configured to communicate wirelessly over a local area mesh network, a long-range radio configured to communicate wirelessly over a wide area network and a controller that checks a performance of the local area mesh network against one or more predetermined performance criteria. When the performance of the local area mesh network meets a set of one or more predetermined performance criteria, the utility meter communicates a first set of the information to the head-end system using the short-range radio. When the performance of the local area mesh network does not meet the set of one or more predetermined performance criteria, the utility meter communicates a second set of information to the head-end system using the long-range radio.

19 Claims, 7 Drawing Sheets

UTILITY METER WITH SHORT AND LONG-RANGE RADIOS WITH INTELLIGENT SWITCHING THEREBETWEEN

TECHNICAL FIELD

The present disclosure relates generally to utility meters. More particularly, the present disclosure relates to utility meters that communicate with a head-end system of a utility network.

BACKGROUND

Utility meters are used to provide a measure of consumption for a variety of different utility providers. Utility meters include, for example, electricity meters that provide a measure of electricity consumed, gas meters that provide a measure of gas consumed and water meters that provide a measure of water consumed. Many utility meters include radios that permit the utility meters to communicate with a head-end system such as the utility itself. What would be desirable are utility meters that can communicate via a short-range radio over a mesh network and intelligently switch to a long-range radio when the mesh network becomes unavailable, inefficient or overloaded.

SUMMARY

The present disclosure relates to utility meters that are configured to intelligently switch between communicating using a short-range radio and a long-range radio. In one example, a utility meter is configured to monitor consumption of a consumable provided by a utility provider and to provide messages related to consumption of the consumable to a head-end system. The illustrative utility meter includes a metrology core that is configured to measure consumption of the consumable (e.g. electricity, gas or water), a short-range radio that is configured to communicate wirelessly over a local area mesh network. The illustrative utility meter further includes a long-range radio that is configured to communicate wirelessly over a wide area network. A controller is operably coupled to the metrology core, the short-range radio and the long-range radio. The controller is configured to determine information, at least some of which relates to consumption of the consumable measured by the metrology core. The controller is further configured to check a performance of the local area mesh network against one or more predetermined performance criteria. When the performance of the local area mesh network meets a set of one or more predetermined performance criteria, the controller is configured to communicate a first set of the information to the head-end system using the short-range radio via the local area mesh network. When the performance of the local area mesh network does not meet the set of one or more predetermined performance criteria, the controller is configured to communicate a second set of the information to the head-end system using the long-range radio via the wide area network. In some cases, the second set of the information is different from the first set of the information.

In some cases, the controller may periodically check the performance of the local area mesh network against the one or more predetermined performance criteria. When the performance of the local area mesh network again meets the set of one or more predetermined performance criteria, the controller is configured to communicate the first set of the information to the head-end system using the short-range radio via the local area mesh network and stop communicating the second set of the information to the head-end system using the long-range radio via the wide area network. This may save power.

In another example, a utility meter is configured to monitor consumption of a consumable provided by a utility provider, and to provide messages related to consumption of the consumable to a head-end system. The illustrative utility meter includes a metrology core that is configured to measure consumption of the consumable, a short-range radio that is configured to communicate wirelessly over a local area mesh network, a long-range radio that is configured to communicate wirelessly over a wide area network and a controller that is operably coupled to the metrology core, the short-range radio and the long-range radio. The controller is configured to determine information, at least some of which relates to consumption of the consumable measured by the metrology core. The controller is further configured to listen for nodes in one or more local area mesh networks, and to identify a measure of signal quality for each identified node. The controller is further configured to join the local area mesh network that includes the node with a highest measure of signal quality if allowed to join. In some cases, the utility meter is allowed to join the local area mesh network when a hop limit of the local area mesh network has not yet been exceeded. If the utility meter is not allowed to join the local area mesh network that includes the node with the highest measure of signal quality, the controller is configured to join the local area mesh network that includes the node with a next highest measure of signal quality if allowed to join. If the utility meter is allowed to join one of the local area mesh networks, the controller is configured to communicate a first set of the information to the head-end system using the short-range radio via the local area mesh network. If the utility meter is not allowed to join any of the local area mesh networks, the controller is configured to communicate a second set of the information to the head-end system using the long-range radio via the wide area network, wherein the second set of the information is different from the first set of the information.

In another example, a method includes maintaining communication between a utility meter and a head-end system using an edge router that hosts a local area mesh network that includes a plurality of utility meters. Each of the plurality of utility meters has both a short-range radio and a long-range radio and an ability to determine when to switch between using the short-range radio and the long-range radio. A performance of the local area mesh network is monitored. When the performance of the local area mesh network remains at or above a performance threshold, the utility meter uses its short-range radio to communicate to the head-end system using the local area mesh network via the edge router. When the performance of the local area mesh network drops below the performance threshold, the utility meter uses its long-range radio to communicate with the head-end system. The utility meter may periodically turn on the short-range radio to ascertain a current performance of the local area mesh network, and revert to using the short-range radio to communicate to the head-end system using the local area mesh network once the current performance of the local area mesh network has regained the performance threshold.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Figure 1:
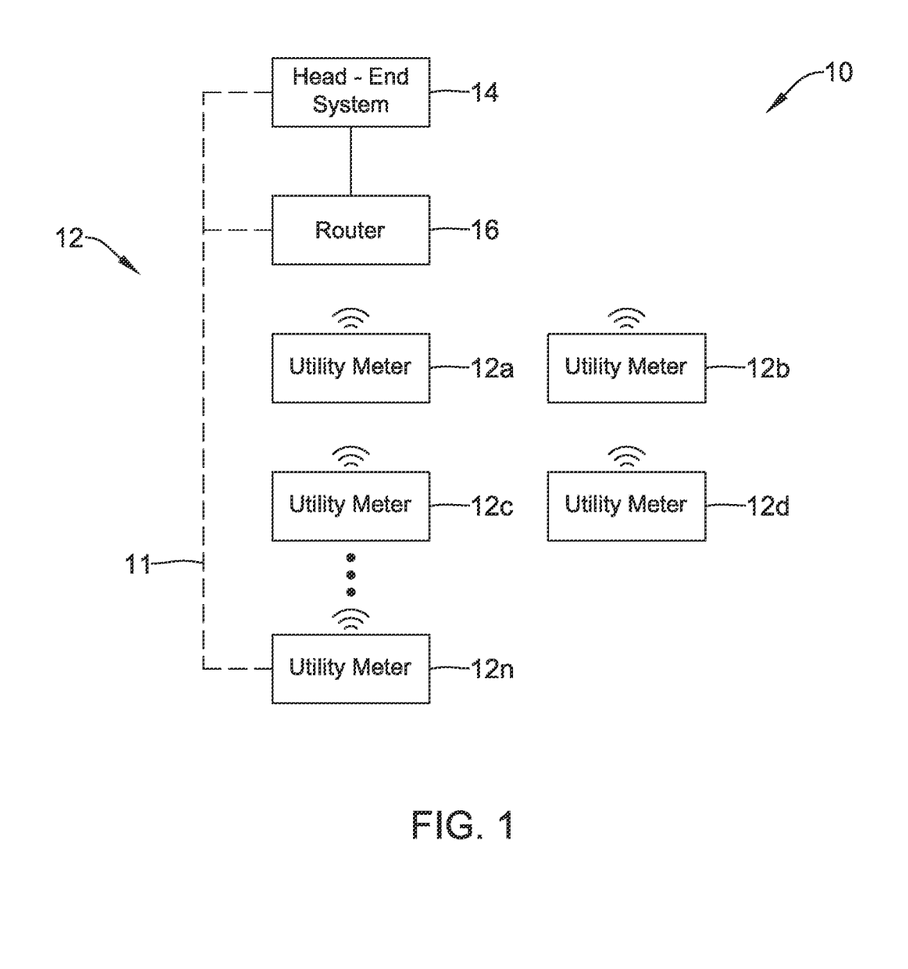
FIG. 1 is a schematic block diagram of an illustrative local area mesh network formed between a plurality of utility meters.

FIG. 1 is a schematic block diagram of an illustrative local area mesh network 10 that includes a number of utility meters 12. The utility meters 12 are individually labeled as 12a, 12b, 12c, 12d through 12n. The utility meters 12 may individually represent, for example, electricity meters, gas meters or water meters, although in some instances there are differences in how each of the different types of utility meters 12 are able to communicate, as will be discussed. The local area mesh network 10 may include any number of utility meters 12, although in some cases, the local area mesh network 10 may impose a limit on how many "hops" are permitted within the local area mesh network 10 as efficiency declines as the total number of hops increases. While not expressly shown in FIG. 1, each of the utility meters 12 may include a short-range radio that enables the utility meters 12 to communicate with each other and ultimately communicate with a head-end system 14 via a router 16. The head-end system 14 may be considered as representing the utility that produces the consumable that is measured by the utility meter 12. Accordingly, the head-end system 14 may represent, for example, an electric utility, a gas utility or a water utility. In some cases, the head-end system 14 may represent a computer system located at the particular utility. In some instances, the head-end system 14 may represent a cloud-based computer system that is operably coupled with the utility, or at least with a computer system located at the utility.

In sending a communication, each utility meter 12 is attempting to ultimately provide that communication to the head-end system 14. A particular utility meter 12 will communicate with the head-end system 14 via the local area mesh network 10 in a manner that is most efficient and that has an acceptable signal-to-noise ratio. To illustrate, the utility meter 12b may communicate with the head-end system 14 by wirelessly sending a message to the utility meter 12a. The utility meter 12a may then repeat the message to the head-end system 14. The utility meter 12c may communicate with the head-end system 14 by wirelessly sending a message to the utility meter 12a, which then repeats the message to the head-end system 14 if that route is determined to be efficient. Alternatively, the utility meter 12c may communicate with the head-end system 14 by wirelessly sending a message to the utility meter 12b, which then repeats the message to the utility meter 12a, if that particular route is more efficient. The utility meter 12a then repeats the message to the head-end system 14. It a particular utility meter goes down and drops out of the mesh network, the remaining utility meters may re-route their communication path through the remaining utility meters, providing a robust communication network. These are just examples. The local area mesh network 10 is called a mesh network in part because communications are not always linear, but can move laterally and dynamically within the mesh network in order to provide efficient and robust communication between each of the utility meters 12 and the head-end system 14.

The utility meters 12 also include a long-range radio that is configured to communicate over a wide area network 11. To illustrate, the utility meter 12n may use its long-range radio to communicate over the wide area network 11 (shown in dashed lines). The wide area network 11 may allow the utility meter 12n to communicate with the head-end system 14 independent from the local area mesh network. In some cases, the long-range radio may communication directly with the head-end system via a cellular or other wide area network. In some cases, the long-range radio may communicate with a gateway (e.g. router 16) that relays the communication messages received from the long-range radio to the head-end system via the Internet backbone.

In some cases, the long rage radio may communicate using cellular communication technology. In some cases, the long-range radio may be implemented in accordance with one of NB-IoT, LTE, CAT-M1, LoRaWAN, SigFox, or 5G. In some cases, the long-range radio may use a proprietary long-range communication protocol on Sub-GHz frequency bands like 169 MHz and 433 MHz license free frequency bands. In some cases, the long-range radio may be provided by an ultra low power long-range transceiver model number SX1276 available from Semtech. These are just examples.

Figure 2:
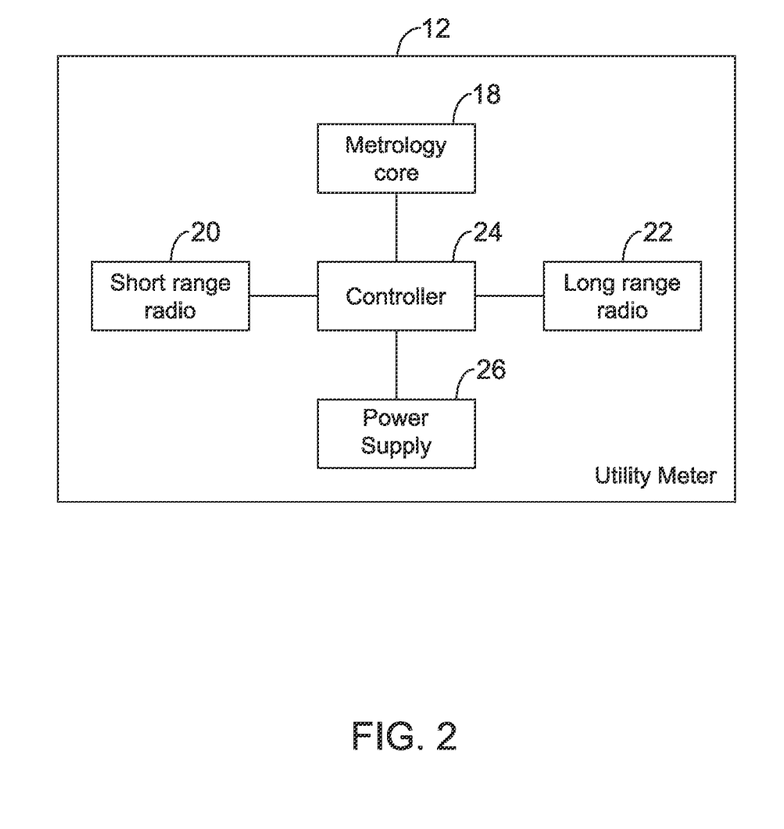
FIG. 2 is a schematic block diagram of an illustrative utility meter usable within the illustrative local area mesh network of FIG. 1.

FIG. 2 is a schematic block diagram of one of the utility meters 12. The utility meter 12 is configured to monitor consumption of a consumable that is provided by a utility provider and to provide messages that are related to consumption of the consumable to the head-end system 14. The messages may also provide diagnostic and other information to the head-end system. The utility meter 12 may be configured to join as a node in the local area mesh network 10 and to communicate with other utility meters 12 via the local area mesh network 10.

The illustrative utility meter 12 includes a metrology core 18 that is configured to measure consumption of the consumable. If the utility meter 12 is an electricity meter, for example, the metrology core 18 is configured to measure an amount of electricity that is consumed. If the utility meter 12 is a gas meter or a water meter, the metrology core is configured to measure an amount of gas that is consumed or an amount of water that is consumed, respectively. The illustrative utility meter 12 includes a short-range radio 20 that is configured to communicate wirelessly over the local area mesh network 10 and a long-range radio 22 that is configured to communicate over the wide area network 11. In some instances, the long-range radio 22 is a cellular radio for communicating over a cellular telecommunications network, but this is not required. In some cases, the short-range radio 20 may have a communication range of less than one-quarter mile, and the long-range radio 22 may have a range of one half mile or greater, but this is just an example.

A controller 24 is operably coupled to the metrology core 18, the short-range radio 20 and the long-range radio 22 and is configured to determine information. At least some of the information relates to consumption of the consumable as measured by the metrology core 18. In some cases, the information also includes diagnostic and/or performance information related to the operation of the corresponding utility meter 12. In one example, the controller is configured to check a performance of the local area mesh network 10 against one or more predetermined performance criteria. When the performance of the local area mesh network 10 meets a set of one or more predetermined performance criteria, the controller 24 is configured to communicate a first set of the information to the head-end system 14 using the short-range radio 20 via the local area mesh network 10. When the performance of the local area mesh network 10 does not meet the set of one or more predetermined performance criteria, the controller 24 is configured to communicate a second set of the information to the head-end system 14 using the long-range radio 22 via the wide area network 11. The second set of the information may be different from the first set of the information. In some cases, the second set of the information may be less than the first set of the information, such as only diagnostic information of the utility meter or just a summary of consumption information rather than more detailed consumption information, etc.

The controller 24 of FIG. 2 is further configured to repeatedly check the performance of the local area mesh network 10 against the one or more predetermined performance criteria, and when the performance of the local area mesh network 10 again meets the set of one or more predetermined performance criteria, the controller 24 is configured to communicate the first set of the information to the head-end system 14 using the short-range radio 20 via the local area mesh network 10 and stop communicating the second set of the information to the head-end system 14 using the long-range radio 22 via the wide area network 11.

In some instances, the one or more predetermined performance criteria of the local area mesh network 10 includes a maximum number of allowed hops in the local area mesh network 10, and wherein the performance of the local area mesh network 10 does not meet the set of one or more predetermined performance criteria when adding the utility meter 12 to the local area mesh network 10 would cause the number of hops of the local area mesh network 10 to exceed the maximum number of allowed hops. The one or more predetermined performance criteria of the local area mesh network 10 may include a signal quality metric and/or other performance metrics.

In some cases, when the performance of the local area mesh network 10 meets the set of one or more predetermined performance criteria, the controller 24 may be configured to communicate the first set of the information in accordance with a first communication schedule. When the performance of the local area mesh network 10 does not meet the set of one or more predetermined performance criteria, the controller 24 may be configured to communicate the second set of the information in accordance with a second communication schedule, wherein the second communication schedule communicates at least some of the information less frequently relative to the first communication schedule.

In some instances, the controller 24 may be configured to listen for nodes in one or more local area mesh networks 10 and to identify a measure of signal quality for each identified node. The controller 24 may be configured to join the local area mesh network 10 that includes the node with a highest measure of signal quality if allowed to join. In some cases, the utility meter is allowed to join the local area mesh network when a hop limit of the local area mesh network has not yet been exceeded. If the utility meter 12 is not allowed to join the local area mesh network 10 that includes the node with the highest measure of signal quality, the controller 24 may be configured to join the local area mesh network 10 that includes the node with a next highest measure of signal quality if allowed to join. If the utility meter 12 is allowed to join one of the local area mesh networks 10, the controller 24 may be configured to communicate a first set of the information to the head-end system 14 using the short-range radio 20 via the local area mesh network 10. If the utility meter 12 is not allowed to join any of the local area mesh networks 10 discovered by the controller 24, the controller 24 may be configured to communicate a second set of the information to the head-end system 14 using the long-range radio 22 via the wide area network 11, wherein the second set of the information is different from the first set of the information.

In some cases, as detailed above, the second set of the information may include less information than the first set of the information. In some cases, the first set of the information and the second set of the information each include diagnostic information for the utility meter 12. To illustrate, the following table provides examples of differences between the quantity and type of information transmitted using the short-range radio 20 versus the long-range radio 22:

| Short-range | Long-range |
| --- | --- |
| Communication many times in a day, low power consumption due to short-range. configuration | Communication once per a day or per week or once per 2 weeks based on |
| 15-min consumption interval data in the day, hourly consumption data in the day, hourly diagnostics and device status. Daily snapshot data for billing, Daily events and metrology log books reading/publishing. Few 3-4K bytes of data every day. Always used if available | Only Daily consumption data and Current Diagnostic data. <50-bytes of payload are sent once a week. 4-bytes of daily consumption reading + 2-bytes of diagnostics every day for 7 days in a week. 7 * 6 = 42-bytes + header information. Switched to Long-range only if 2-days of no connectivity to Short-range communication (number of days configurable) |
| If short-range is unavailable due to any above-described reasons, then device will be move to Long-range. Once in a week, short-range radio is switched on to check Mesh connectivity and scanning of routers. If nearby routers are detected, then a link check is performed to confirm the good connectivity both ways. If link looks good, then switches from Long-range to short-range mesh radio | Switches to Long-range when mesh network size is growing above a limit (> 20 hops) to avoid latency and loading the intermediate routers. Beyond 20 hops mesh network will not accept any children so long-range radio is used during these periods of mesh communication rejection due to hop limit reach |

Figure 2A:
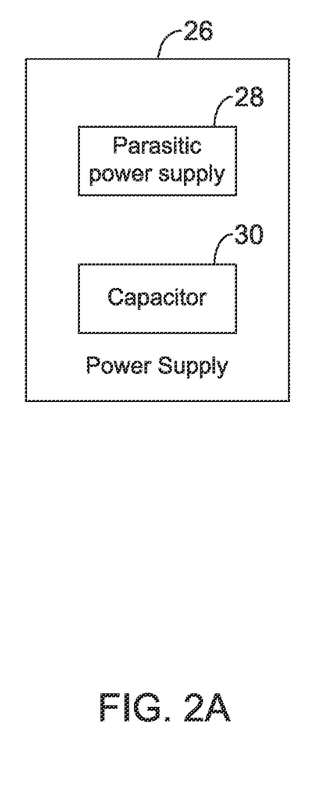
FIG. 2A is a schematic block diagram of a portion of the illustrative utility meter of FIG. 2.

The utility meter 12 may include a power supply 26 that is operably coupled to the short-range radio 20, the long-range radio 22 and the controller 24. The power supply 26 may vary, depending on which consumable the utility meter 12 is configured to measure. If the utility meter 12 is a gas meter or a water meter, the power supply 26 may include a battery. However, if the utility meter 12 is an electricity meter, and as seen in FIG. 2A, the power supply 26 may include a parasitic power supply 28 that parasitically captures operating power from the power being measured, and a capacitor 30 that is charged by the parasitic power supply 28. The capacitor 30 may be configured to provide a limited amount of power to the electricity meter when the power being measured is not available.

Figure 3:
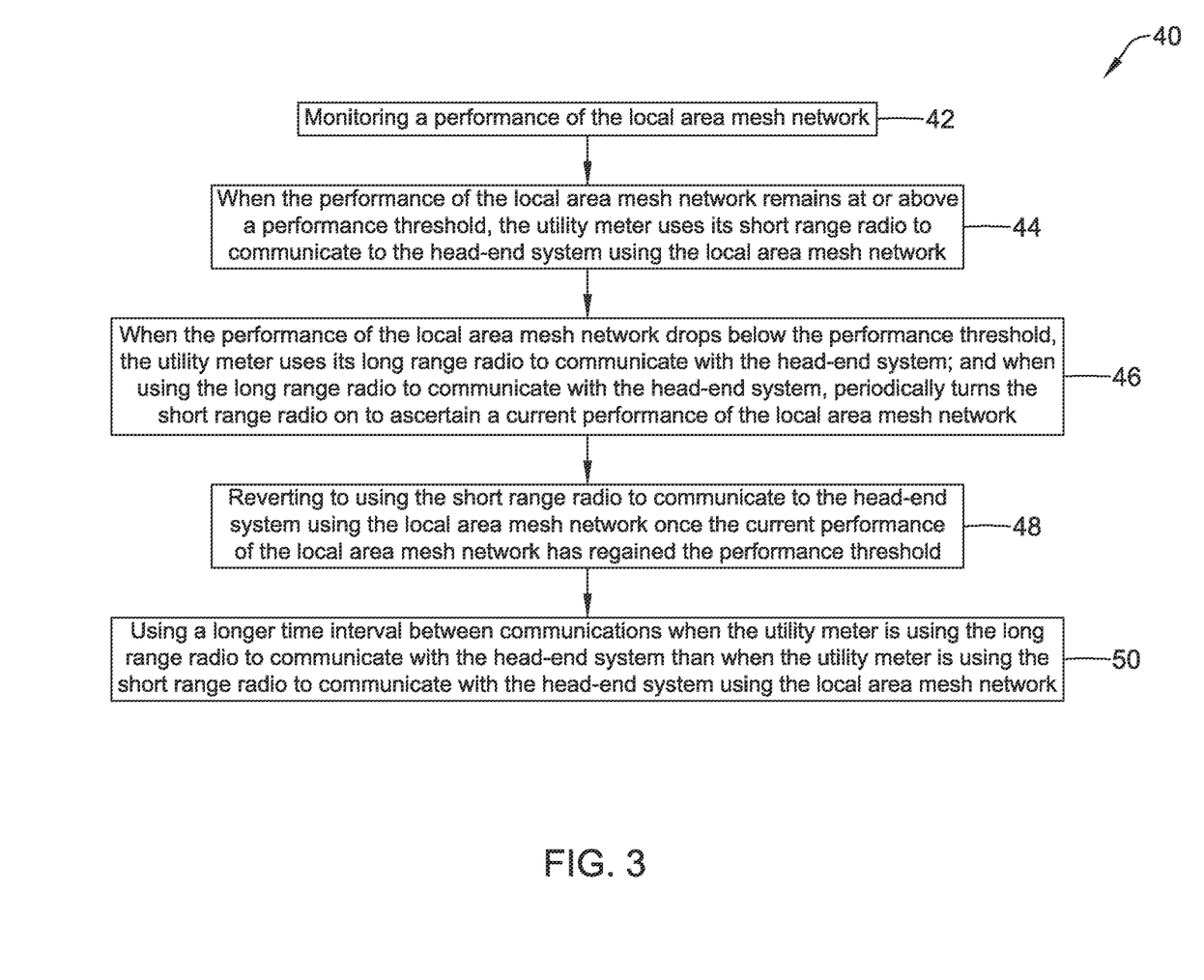
FIG. 3 is a flow diagram showing an illustrative method of maintaining communication between a utility meter and a head-end system.

FIG. 3 is a flow diagram showing an illustrative method 40 of maintaining communication between a utility meter (such as the utility meter 12) and a head-end system (such as the head-end system 14) using an edge router (such as the edge router 16) that hosts a local area mesh network (such as the local area mesh network 10) that includes a plurality of utility meters. Each of the plurality of utility meters have both a short-range radio (such as the short-range radio 20) and a long-range radio (such as the long-range radio 22) and an ability to determine when to switch between using the short-range radio and the long-range radio.

The illustrative method 40 includes monitoring a performance of the local area mesh network, as indicated at block 42. When the performance of the local area mesh network remains at or above a performance threshold, the utility meter uses its short-range radio to communicate to the head-end system using the local area mesh network, as indicated at block 44. When the performance of the local area mesh network drops below the performance threshold, the utility meter uses its long-range radio to communicate with the head-end system.

When using the long-range radio to communicate with the head-end system, the method 40 includes periodically turning the short-range radio on to ascertain a current performance of the local area mesh network, as indicated at block 46. The method 40 further includes reverting to using the short-range radio to communicate to the head-end system using the local area mesh network once the current performance of the local area mesh network has regained the performance threshold, as indicated at block 48. In some cases, and as indicated at block 50, a longer time interval between communications may be used when the utility meter is using the long-range radio to communicate with the head-end system relative to when the utility meter is using the short-range radio to communicate with the head-end system using the local area mesh network.

In some cases, a power disruption may interfere with the local area mesh network 10. It will be appreciated that how the utility meters 12 respond to the power disruption will depend at least in part upon whether the utility meter 12 is an electricity meter, a gas meter or a water meter. If the utility meter 12 is an electricity meter, the utility meter 12 will immediately switch over to its long-range radio 22. The utility meter 12 will send short messages infrequently until power is regained. The capacitor 30 is configured to provide enough energy to transmit six or eight messages over the long-range radio 22 and stay alive for a minimum of 24 to 48 hours. In some instances, the first message may be transmitted one hour after the power is disrupted. Subsequent messages may be sent on an ever-decreasing frequency. As an example, the message transmit time (the time between subsequent transmissions) may be set equal to:

$$\text{message transmit time} = X + 2^N$$

where,
  X is the time at which the power was disrupted, and
  N is an integer equal to 0, 1, 2, etc.
In this example, messages may be sent in accordance with a schedule:
  First message sent at X+1 hours
  Second message sent at X+2 hours
  Third message sent at X+4 hours
  Fourth message sent at X+16 hours
  Fifth message sent at X+32 hours, and so on.

It will be appreciated that this is merely illustrative. In some cases, any subsequent messages (if power remains to send them) may be sent every 24 hours, for example.

When power returns, electricity meters immediately sense that power has returned, and will periodically look for available mesh networks. In one example, first hop meters will join the edge routers within two minutes of power being restored. Second hop meters join the mesh network within about 2 minutes of the first hop meters joining. This process continues until, for example, $20^{th}$ hop meters have joined, which should be within about an hour of power being restored. It will be appreciated that the total number of hops allowed for the mesh network may be user configurable, and may not be set equal to 20.

For gas meters and water meters, they will typically not be able to join as fast as electricity meters. Due to their battery limitations, gas meters and water meters may check for nearby mesh routers that host a mesh network using a discovery mechanism that executes, for example, once every 8 hours for a short period of time such as 30 seconds. If the gas meter or water meter does not discover any nearby mesh routers advertising their availability, the gas or water meter will immediately turn off its short-range radio and will continue to use the long-range radio. In some cases, the 8 hour time frame is configurable from 8 hours to 12 hours or 24 hours or even to once per week. This configuration may be set when the gas meter or the water meter is initially installed, for example.

In some cases, a new utility meter 12 may be installed and may thus be looking to join an existing local area mesh network 10. In one example, the new utility meter 12 will go into a listening mode in which the new utility meter 12 is listening for advertisements from any and all nearby mesh routers. The new utility meter 12 will identify all nearby mesh routers, including the mesh routers 16 and any utility meters 12, which can also function as routers, and will prepare a list of detected routers. The new utility meter 12 will select the mesh router 16 (or another utility meter 12) with the best signal strength, and perform a link check with that mesh router 16 (or another utility meter 12) by sending a LinkCheckRequest. In response, the mesh router 16 (or another utility meter 12) will return a LinkCheckResponse. In some cases, a signal strength value is communicated during these link check. The new utility meter 12 can thus verify good two-way communication and will send a join request.

If the mesh router 16 or the another utility meter 12 is not at its highest mesh hop limit, the mesh router 16 or the another utility meter 12 will respond with join success. However, if the router 16 (or the another utility meter 12) is already at its highest mesh hop limit, the router 16 (or the another utility meter 12) will indicate this to the new utility meter 12 and thus cannot honor the join request. The new utility meter 12 will continue on to the next router 16 on its list of routers. If no routers 16 (or the another utility meter 12) are able to honor its join request, the new utility meter 12 switches to using its long-range radio 22 to communicate with the head-end system.

Figure 4:
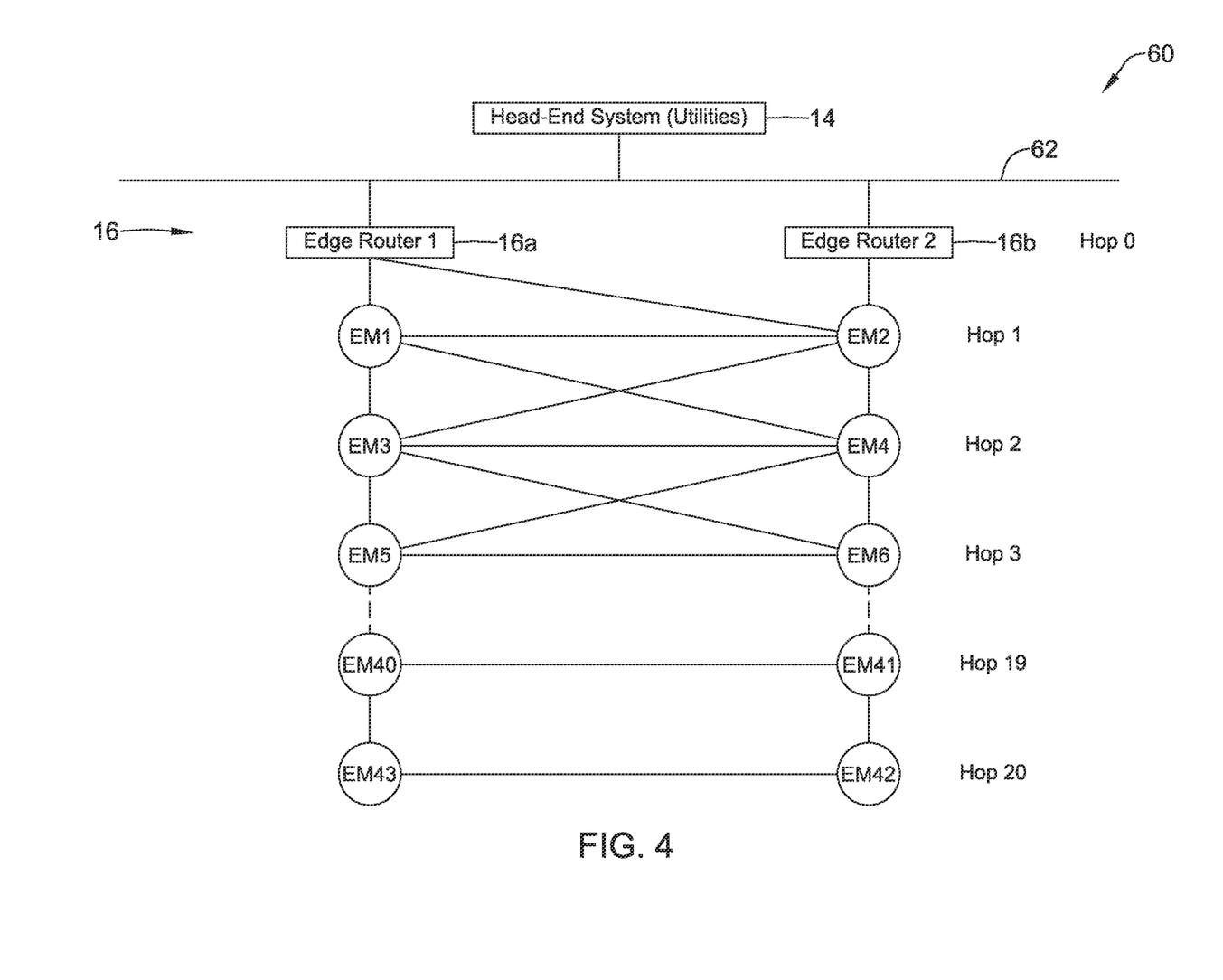
FIG. 4 is a schematic block diagram of an illustrative local area mesh network formed between a plurality of utility meters.
Figure 5:
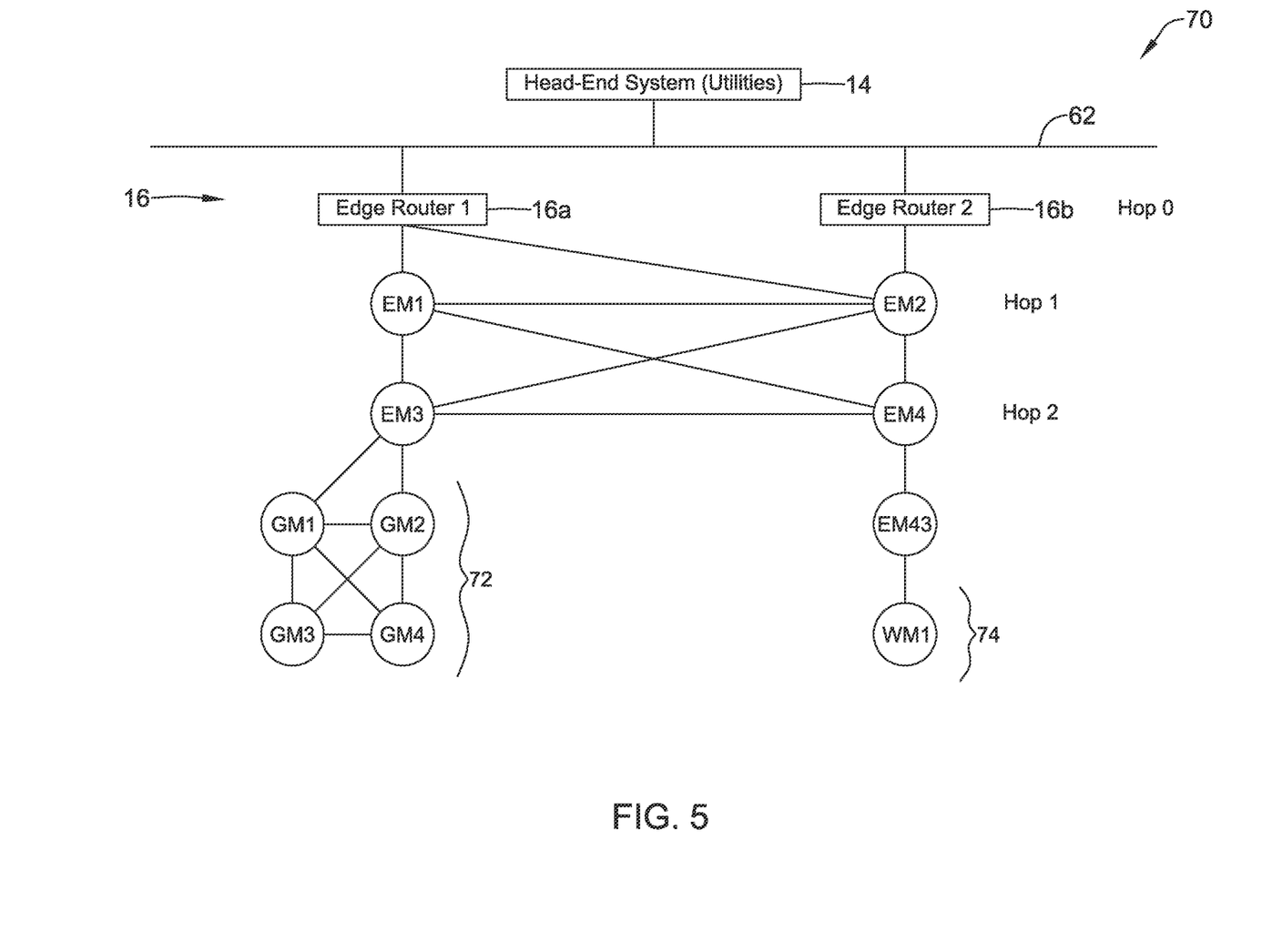
FIG. 5 is a schematic block diagram of an illustrative local area mesh network formed between a plurality of utility meters.
Figure 6:
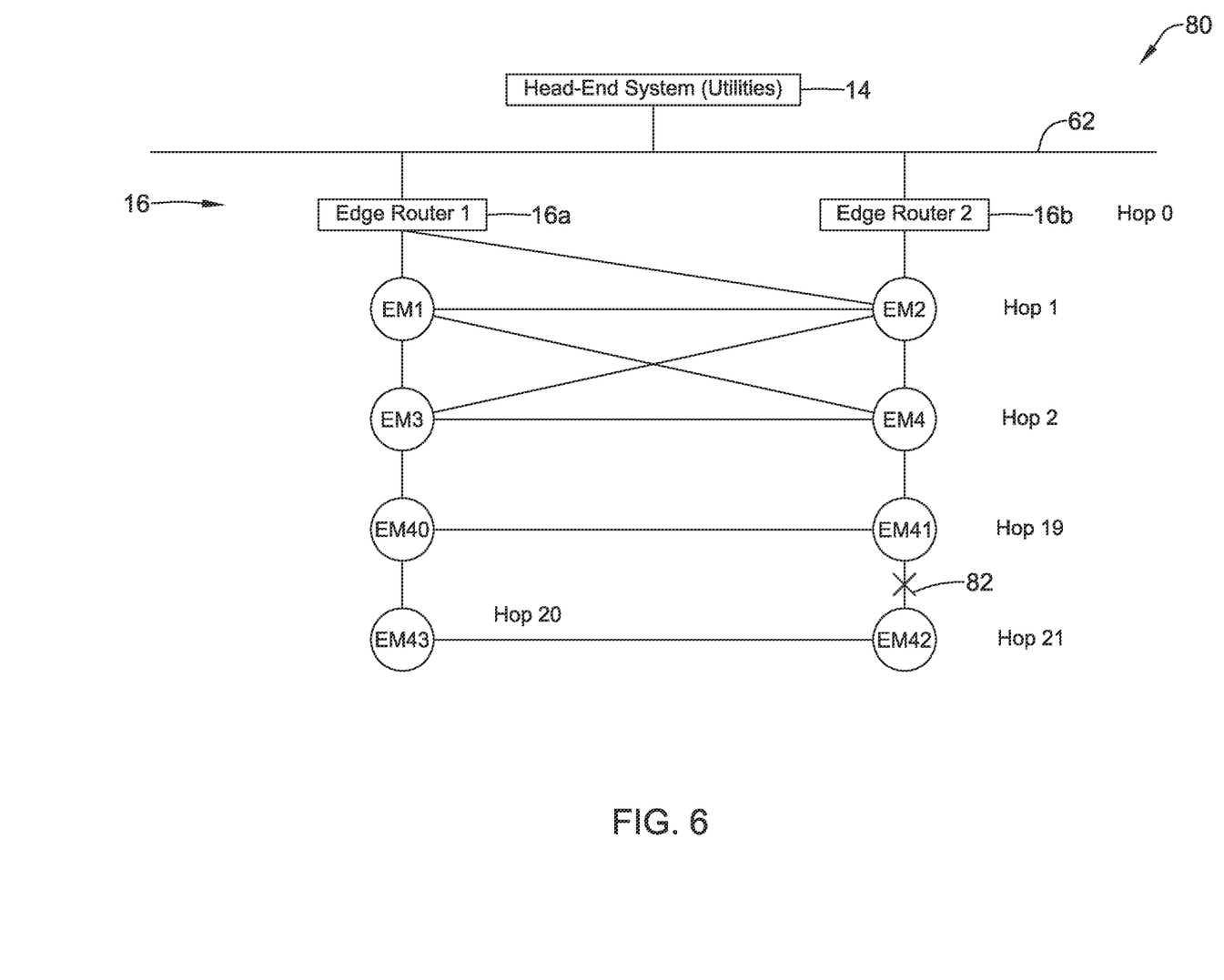
FIG. 6 is a schematic block diagram of an illustrative local area mesh network formed between a plurality of utility meters.

FIGS. 4 through 6 are schematic block diagrams of mesh networks, showing examples of how electricity meters, gas meters and water meters can be joined together in a mesh network. In FIG. 4, a local area mesh network 60, which may be considered as being an example of the local area mesh network 10, includes a first edge router 16a and a second edge router 16b. Each edge router 16 may serve as a mesh top node that connects mesh nodes to the head-end system 14 via a wired interface 62. In FIG. 4, each of the utility meters are electricity meters, as indicated by the EM # nomenclature. It can be seen that EM1, EM3, EM5 through EM40 and EM43 are aligned under the first edge router 16a and EM2, EM4, EM6 through EM41 and EM42 are aligned under the second edge router 16b. FIG. 4 includes the indications of hop numbers as well, to illustrate how that is determined.

FIG. 5 is a schematic block diagram of a local area mesh network 70, which may be considered as being an example of the local area mesh network 10. The local area mesh network 70 includes both electricity meters, indicated by the EM # nomenclature, but also includes gas meters indicated by the GM # nomenclature as well as a water meter indicated by the WM1 nomenclature. In this example, gas meters are routing devices, but only route for other gas meters. In some cases, as illustrated, the gas meters form a separate wing 72 in the mesh network 70. In this example, water meters do not have router functionality, and will be the last hop 74 in the mesh network 70. It will be appreciated that water meters have limited communication ability due to their typically being located in pits and having very small batteries.

FIG. 6 is a schematic block diagram of a local area mesh network 80, which may be considered as being an example of the local area mesh network 10. The local area mesh network 80 is similar to the local area mesh network 60, but includes a break 82 that has formed between EM41 and EM42. The break 82 may occur for a variety of reasons. In this particular example, assume that the maximum number of hops is set equal to 20. Because of the break, EM42 now becomes hop number 21. Thus, either EM43 or the edge routers 16 will inform EM42 that EM42 cannot remain in the local area mesh network 80. In response, EM42 will look for another local area mesh network (same procedure as if EM42 was a newly installed meter) and will switch to its long-range radio if unsuccessful in finding a new local area network.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A utility meter that is configured to monitor consumption of a consumable provided by a utility provider, and to provide messages related to consumption of the consumable to a head-end system, the utility meter comprising:
   a metrology core configured to measure consumption of the consumable;
   a short-range radio configured to communicate wirelessly over a local area mesh network;
   a long-range radio configured to communicate over a wide area network;
   a controller operably coupled to the metrology core, the short-range radio and the long-range radio, the controller configured to:
     determine information at least some of which relates to consumption of the consumable measured by the metrology core;
     checking a performance of the local area mesh network against one or more predetermined performance criteria;

when the performance of the local area mesh network
meets a set of one or more predetermined performance criteria, communicate at least some of the information to the head-end system in accordance with a first communication schedule using the short-range radio via the local area mesh network;
when the performance of the local area mesh network does not meet the set of one or more predetermined performance criteria:
communicate at least some of the information to the head-end system in accordance with a second communication schedule using the long-range radio via the wide area network, wherein the second communication schedule communicates information less frequently relative to the first communication schedule;
check the performance of the local area mesh network against the one or more predetermined performance criteria, and when the performance of the local area mesh network meets the set of one or more predetermined performance criteria:
communicate at least some of the information to the head-end system using the short-range radio via the local area mesh network; and
stop communicating the at least some of the information to the head-end system using the long-range radio via the wide area network.

2. The utility meter of claim 1, wherein the one or more predetermined performance criteria of the local area mesh network includes a maximum number of allowed hops in the local area mesh network, and wherein the performance of the local area mesh network does not meet the set of one or more predetermined performance criteria when adding the utility meter to the local area mesh network would cause the number of hops of the local area mesh network to exceed the maximum number of allowed hops.

3. The utility meter of claim 1, wherein the set of one or more predetermined performance criteria of the local area mesh network comprises a signal quality metric.

4. The utility meter of claim 1, wherein the long-range radio comprises a cellular radio for communicating over a cellular telecommunications network.

5. The utility meter of claim 1, wherein the short-range radio has a communication range of less than one-quarter mile, and the long-range radio has a range of one half mile or greater.

6. The utility meter of claim 1, wherein the controller communicates more of the information to the head-end system when communicating using the short-range radio via the local area mesh network than when communicating using the long-range radio via the wide area network.

7. The utility meter of claim 6, wherein:
the information determined by the controller includes diagnostic information related to the utility meter and consumption information related to consumption of the consumable measured by the metrology core, wherein the consumption information includes summary consumption information and detailed consumption information, and wherein the controller is configured to communicate the detailed consumption information when communicating using the short-range radio but not when communicating using the long-range radio, and the controller is configured to communicate the summary consumption information and at least some of the diagnostic information when communicating using the long-range radio.

8. The utility meter of claim 7, wherein the controller is configured to communicate at least some of the diagnostic information when communicating using the short range radio.

9. The utility meter of claim 1, wherein the consumable comprises a gas, and the metrology core is configured to measure consumption of the gas.

10. The utility meter of claim 1, wherein the consumable comprises water, and the metrology core is configured to measure consumption of the water.

11. The utility meter of claim 1, wherein the utility meter further comprises a power supply operably coupled to the short-range radio, the long-range radio and the controller.

12. The utility meter of claim 11, wherein the utility meter comprises an electricity meter, and the power supply comprises:
a parasitic power supply captured from the power being measured; and
a capacitor that is charged by the parasitic power supply, the capacitor configured to provide a limited amount of power to the electricity meter when the power being measured is not available.

13. The utility meter of claim 11, wherein the utility meter comprises a gas meter or a water meter, and the power supply comprises a battery.

14. The utility meter of claim 1, wherein the utility meter is configured to join as a node in the local area mesh network and communicate with other utility meters via the local area mesh network.

15. A utility meter that is configured to monitor consumption of a consumable provided by a utility provider, and to provide messages related to consumption of the consumable to a head-end system, the utility meter comprising:
a metrology core configured to measure consumption of the consumable;
a short-range radio configured to communicate wirelessly over one or more local area mesh networks;
a long-range radio configured to communicate over a wide area network;
a controller operably coupled to the metrology core, the short-range radio and the long-range radio, the controller configured to:
determine information at least some of which relates to consumption of the consumable measured by the metrology core;
listen for nodes in one or more local area mesh networks, and identify a measure of signal quality for each identified node;
join the local area mesh network that includes the node with a highest measure of signal quality if allowed to join;
if the utility meter is not allowed to join the local area mesh network that includes the node with the highest measure of signal quality, join the local area mesh network that includes the node with a next highest measure of signal quality if allowed to join;
if the utility meter is allowed to join one of the local area mesh networks, communicate at least some of the information to the head-end system in accordance with a first communication schedule using the short-range radio via the local area mesh network; and
if the utility meter is not allowed to join any of the local area mesh networks, communicate at least some of the information to the head-end system in accordance with a second communication schedule using the long-range radio via the wide area network, wherein the second communication schedule communicates information less frequently relative to the first communication schedule.

16. The utility meter of claim 15, wherein the short-range radio has a communication range of less than one-quarter mile, and the long-range radio has a range of one half mile or greater.

17. The utility meter of claim 15, wherein the controller is configured to communicate more of the information to the head-end system when communicating using the short-range radio via the local area mesh network than when communicating using the long-range radio via the wide area network.

18. The utility meter of claim 15, wherein the utility meter is configured to join as a node in a local area mesh network and communicate with other utility meters on the local area mesh network.

19. A method of maintaining communication between a utility meter and a head-end system using an edge router that hosts a local area mesh network that includes a plurality of utility meters, each of the plurality of utility meters having both a short-range radio and a long-range radio and an ability to determine when to switch between using the short-range radio and the long-range radio, the method comprising:

monitoring a performance of the local area mesh network;

when the performance of the local area mesh network remains at or above a performance threshold, the utility meter uses its short-range radio to communicate to the head-end system using the local area mesh network;

when the performance of the local area mesh network drops below the performance threshold, the utility meter uses its long-range radio to communicate with the head-end system;

when using the long-range radio to communicate with the head-end system, periodically turning the short-range radio on to ascertain a current performance of the local area mesh network, and reverting to using the short-range radio to communicate to the head-end system using the local area mesh network once the current performance of the local area mesh network has regained the performance threshold; and when the utility meter is using the long-range radio to communicate with the head-end system, using a longer time interval between communications than when the utility meter is using the short-range radio to communicate with the head-end system using the local area mesh network.

* * * * *